United States Patent [19]
Thibaut

[11] 3,939,673
[45] Feb. 24, 1976

[54] DEVICE FOR PREVENTING UNBALANCE IN WASHING MACHINES DURING SPINDRYING

[75] Inventor: Yves Albert Daniel Thibaut, Amiens (Somme), France

[73] Assignee: U.S. Philips Corporation, New York, N.Y.

[22] Filed: Mar. 13, 1974

[21] Appl. No.: 450,726

[30] Foreign Application Priority Data
Mar. 15, 1973 France .............................. 73.09350

[52] U.S. Cl................................................ 68/12 R
[51] Int. Cl.² ....................................... D06F 33/02
[58] Field of Search ........................ 68/12 R, 23, 24

[56] References Cited
UNITED STATES PATENTS 3,640,098  2/1972  Eastall................................ 68/12 R
3,736,772  6/1973  Baker................................. 68/12 R FOREIGN PATENTS OR APPLICATIONS
2,044,540  2/1971  France
1,530,872  6/1968  France Primary Examiner—Richard E. Aegerter
Assistant Examiner—Michael H. Thaler
Attorney, Agent, or Firm—Frank R. Trifari; David R. Treacy

[57] ABSTRACT

A device for avoiding unbalance during acceleration to spindrying. A water level sensor has an additional contact through which a control voltage which is derived from a motor speed regulator is fed, and interrupts the motor supply if the drum speed decreases below a predetermined value. Spindrying cannot commence until after the tub is filled and an operating sequence at washing speed has taken place.

3 Claims, 1 Drawing Figure

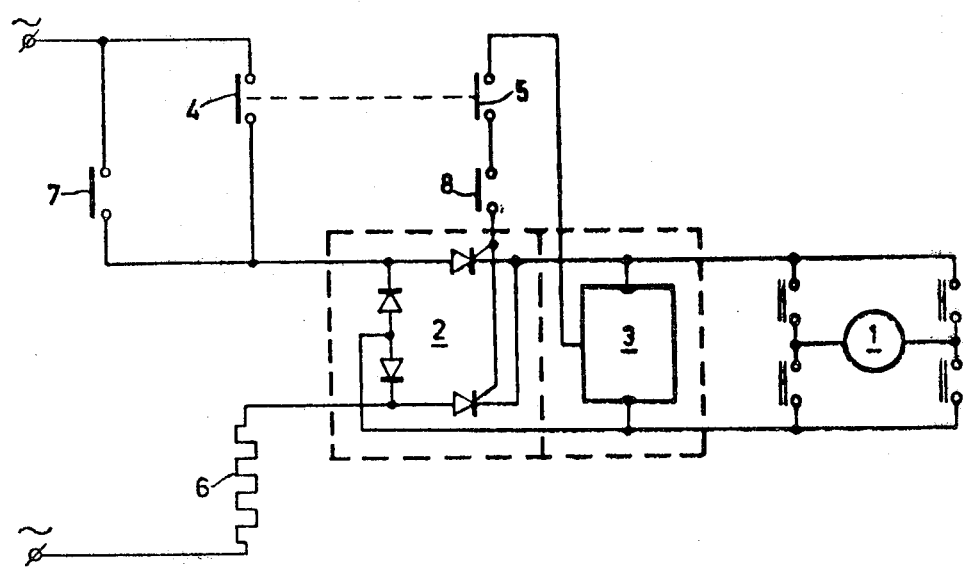

DEVICE FOR PREVENTING UNBALANCE IN WASHING MACHINES DURING SPINDRYING

The invention relates to a device for preventing an unbalance in washing machines during spindrying, which becomes operative after a voluntary or involuntary interruption of the operation of the machine, or after a decrease of the spindrying speed of the drum below a predetermined level, by providing for a sequence of alternating rotations of the drum at the low washing speed before the acceleration to the high spindrying speed.

During an interruption of the operation of a washing machine, owing to for example, a power failure or a voluntary stop during the spindrying cycle, the load which was distributed by the preceding washing cycle with alternating rotations comes off the drum wall and collects at the bottom of the drum. This may also happen if the drum speed decreases below a certain level. The laundry is then more or less dry and its mass may vary within rather wide limits. Accelerating again to the spindrying speed may have serious consequences because of unbalance which gives rise to substantial displacements of the tub-motor assembly, which will then hit the walls of the machine. The effects of the unbalance are especially marked in light weight machines having a low balancing mass and in which acceleration to spindrying is effected with a filled tub. In that case, the critical speed is always passed when the tub is still filled with water, i.e. when the mass of the tub-motor assembly is still substantial, and as rapidly as possible in order that vibrations of a high amplitude cannot build up.

From French Pat. Specification 1,530,872 a control device for the drive motor of the drum of a washing machine is known which, when a spindrying cycle is controlled independently of the washing cycle or after voluntary or involuntary stoppage of the machine, causes said motor to start with a cycle of alternating rotations at washing speed so as to tumble and distribute the load. Said device moreover comprises a delay means constituted by a pressostat switch sensitive to water level in the tub and a bimetal which is heated by a timer-controlled circuit, which prevents starting of the spindrying cycle while the tub is still filled with water. This known embodiment is an approach towards the solution of the problem of the unbalance during acceleration to spindrying after a stop. However, switching to alternating rotation at washing speed cannot always lead to a satisfactory distribution, especially when the laundry has hardly dried; i.e., at the very beginning of the spindrying cycle. This is also the case when the user employs the machine for spindrying only.

In a device according to the invention, a contact of a water level control device is connected in series in a branch of the circuit of a motor regulating device, which controls the electrical current to the motor, said contact being closed when the tub is empty.

In another embodiment said contact is in series with a second contact associated with the timer, which operates simultaneously with a timer contact associated with the spin-drying made.

The following descriptions and drawing are given by way of example in order that the invention be more fully understood.

The single FIGURE of the drawing is a circuit diagram of a device according to the invention.

French Pat. Specification 1,530,872 describes a device which can be employed in a machine in which spindrying can apparently commence whilst the tub is empty. Moreover, devices are provided for changing over from the washing speed to the spindrying speed when the washing speed reaches 80 to 85% of its rated speed. The drum then accelerates to high speed. This operation is effected each time that the power supply is restored after stopping. It is to be noted that the distribution of the laundry is effected while the tub is empty, the pressostat allowing acceleration to spindrying only while the tub is empty.

According to the invention a laundry distribution cycle, known per se from the French Pat. Specification No. 2,044,540, "Spindrying with filled tub", is performed in the presence of water, so as to obtain an optimum distribution. This is effected each time that the machine is stopped voluntarily or owing to a power failure, or when the spindrying speed has dropped below a previously determined value. The distribution cycle is obtained by filling the tub with water to a sufficient level, followed by a cycle of alternating rotations at washing speed for a given time, after which the timer causes the motor to accelerate to spindrying speed, while the tub is still filled with water, and simultaneously the pump is energized to reduce the water level and allow acceleration to the selected spindrying speed.

The use of a d.c. motor for driving the drum in series with the heating resistance allows a balance to be obtained between the maximum permissible speed and the moment of resistance. Acceleration to spindrying with filled tub presents no problems with such a d.c. motor, because by an appropriate selection of the heating resistance which is connected in series with the motor the speed is automatically limited to a value equal to the maximum speed which is permissible without overflowing. The permanent-magnet d.c. motor 1 used in the embodiment shown in the drawing is energized from the a.c. mains via a bridge with diodes and thyristors 2. The direct voltage supplied by said bridge is controlled by a regulating device 3 of any type well-known in the art which compares the back-e.m.f. of the motor, during the periods when said motor is not energized and behaves as a generator, with a specific reference voltage for the washing speed and the spindrying speed. Such a regulator is shown, for example, in U.S. Pat. No. 3,640,098. Said comparison results in a voltage which is applied to the control electrodes of the thyristors and thus influences the motor supply. The voltage thus supplied to the motor passes via contacts which are disposed on cams which are fixed on a shaft which is driven by a motor (not shown) forming the reversing device and enabling the alternating rotation of the motor by changing the polarity of the supply voltage at the motor terminals.

The device according to the invention comprises two elements, of which one is external and the other is included in the power supply. This is shown by the diagram. By the closure of the contact 4 the pressostat of the machine energizes the motor 1 and the heating resistance 6 in series when filling is completed. A second pressostat contact 5 ensures that the rectifying bridge 2 which supplies the motor can be controlled when it is closed, i.e. when the tub is empty. The closure of the contact 5 enables the control voltage from the regulating device 3 to be applied to the control electrodes of the thyristors.

The contact 5 may be incorporated in the pressostat 4 as shown in the present embodiment or may form an assembly which is separate from the pressostat and which in a similar way as the pressostat responds to the water level in the tub. It is simpler to couple said contact mechanically to the pressostat contact.

The contacts 7 and 8 are associated with the timer and are closed during spindrying.

The operation of the device is as follows:

During acceleration to spindrying, while the tub is filled with water, the contact 4 energizes the motor 1 via the rectifying bridge 2. Acceleration takes place. During this time, the rectifying bridge 2 which forms the power supply operates normally because the tub-empty contact 5 is open and does not control the control electrodes of the thyristors.

After the tub is emptied and when the speed is sufficient (above 80 rpm for the drum) contact 4 opens and contact 7 of the timer ensures the continuation of the motor supply. At the same time the contact 5 closes. The control voltage from the regulator 3 is then fed via the contact 8 to a device for controlling the supply voltage of the motor which maintains the spindrying speed.

If owing to some cause the motor speed, and thus the speed of the drum, drops below a predetermined value, the contacts 5 and 8 remaining closed, the control voltage from 3 interrupts the power supply in the present example by turning off the thyristors. The motor stops and thus the risk of instability owing to the occurrence of an unbalance as a result of a change in distribution of the load is eliminated.

The power supply control device which is controlled by the voltage from the regulating device 3 is not rendered operative during the acceleration phase, for in that case the power supply would be permanently cut off because the motor speed is below the predetermined threshold (80 rpm for the drum).

As the pressostat which comprises 4 provides a delay, it initially allows the acceleration of the motor and the clearance of the threshold. In a second phase, when the tub is empty, contact 5 allows the power supply to be blocked if the speed becomes lower than said threshold.

Thus, the device employs a power supply which comprises a blocking threshold, a pressostat which controls the closure of a contact 5, when the tub is empty in series with a contact 8 which is associated with the timer and which is closed during spindrying.

The combination of said elements thus prevents restarting in the spindrying mode if the voltage at the motor terminals has been cut off.

Thus, the stability of the machine is ensured when:

the user stops the machine during spindrying and starts it again after a certain time during which the laundry can collect at the bottom of the drum.

the supply voltage of the machine has been cut off.

an intermittent defect of electrical contacts occurs in the control elements of the machine.

the user performs a forbidden operation by setting the timer knob to the spindrying cycle whilst the tub is empty and the complete starting process with water cannot be performed.

What is claimed is:

1. A device for preventing excessive imbalance in a clothes washing machine, comprising a drum driving motor, means for supplying voltage to the motor, regulating means sensitive to rotational speed of said motor for providing an output electrical control signal in response to said speed being below a predetermined speed, means for controlling voltage supplied by said supply means in response to an electrical control signal input, a water level switch contact for sensing a tub empty condition, an operating function controller contact for selecting a spin drying function, and means connecting said water level sensing contact and said operating function contact between the regulating means output and said voltage controlling means input such that voltage supplied to said motor will be controlled in response to said speed sensitive signal only when said spin drying function is selected and a tub empty condition is sensed.

2. A device as claimed in claim 1, wherein said voltage supplying means is blocked by said electrical control signal.

3. A device as claimed in claim 1, wherein said contacts are in electrical series connection, the water level switch being closed in response to a tub empty condition, said regulating means output signal is additionally responsive to comparison of motor speed with a spindrying speed, and said voltage supply is blocked by an electrical control signal input corresponding to said motor speed being below said predetermined speed.

* * * * *